US010127536B2

(12) United States Patent
Burba et al.

(10) Patent No.: US 10,127,536 B2
(45) Date of Patent: Nov. 13, 2018

(54) UNIFIED CONTENT REPRESENTATION

(71) Applicant: MICROSOFT TECHNOLOGY LICENSING, LLC, Redmond, WA (US)

(72) Inventors: Alexander Burba, Seattle, WA (US); Brandon T Hunt, Redmond, WA (US); Frank Morrison, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1060 days.

(21) Appl. No.: 14/076,296

(22) Filed: Nov. 11, 2013

(65) Prior Publication Data

US 2015/0134548 A1 May 14, 2015

(51) Int. Cl.
G06Q 20/12 (2012.01)
G06Q 50/18 (2012.01)
H04N 21/254 (2011.01)
H04N 21/4627 (2011.01)

(52) U.S. Cl.
CPC ....... *G06Q 20/1235* (2013.01); *G06Q 50/184* (2013.01); *H04N 21/2541* (2013.01); *H04N 21/4627* (2013.01)

(58) Field of Classification Search
None
See application file for complete search history.

(56) References Cited

U.S. PATENT DOCUMENTS

| 6,792,615 | B1 | 9/2004 | Rowe et al. | |
|---|---|---|---|---|
| 7,020,888 | B2 | 3/2006 | Reynolds et al. | |
| 7,174,126 | B2 * | 2/2007 | McElhatten | G06F 3/0482 348/E5.104 |
| 8,230,343 | B2 * | 7/2012 | Logan | G06F 17/30265 386/291 |
| 2003/0093790 | A1 | 5/2003 | Logan et al. | |
| 2003/0220100 | A1 | 11/2003 | Mcelhatten et al. | |
| 2004/0019901 | A1 | 1/2004 | Spio | |
| 2008/0244755 | A1 | 10/2008 | Cohen et al. | |
| 2009/0185619 | A1 | 7/2009 | Taleb et al. | |
| 2010/0040344 | A1 * | 2/2010 | Mizuno | H04N 5/21 386/343 |
| 2010/0100899 | A1 | 4/2010 | Bradbury | |
| 2010/0161575 | A1 | 6/2010 | Basso et al. | |
| 2010/0306402 | A1 | 12/2010 | Riley | |
| 2012/0311723 | A1 | 12/2012 | Britt, Jr. | |

FOREIGN PATENT DOCUMENTS

| CN | 101512479 A | 8/2009 |
|---|---|---|
| CN | 101682640 A | 3/2010 |
| CN | 102483782 A | 5/2012 |

OTHER PUBLICATIONS

"International Search Report and Written Opinion Issued in PCT Patent Application No. PCT/US2014/063967", dated Jan. 23, 2015, 13 Pages.
"International Preliminary Report on Patentability issued in PCT Application No. PCT/US2014/063967", dated Nov. 4, 2015, 7 Pages.
"Office Action Issued in Chinese Patent Application No. 201480061662. 8", dated May 3, 2018, 11 Pages.

* cited by examiner

*Primary Examiner* — Calvin L Hewitt, II
*Assistant Examiner* — Zehra Raza
(74) *Attorney, Agent, or Firm* — Mark K. Young; Mayer & Williams PC

(57) ABSTRACT

Example apparatus and methods facilitate providing an incremental future-proof license to a master stream of content. The master stream may be related to different instances of content (e.g., different versions) for which there is a unified content representation. A request for content available through the master stream may be received from a licensee. The request may include an explicit indication of which stream of frames is to be accessed or may include implicit information from which a stream of frames may be selected. The selected stream may be changed midstream in response to changing conditions (e.g., bandwidth), events (e.g., gesture), devices (e.g., licensee accesses different device) or explicit requests. As the available streams of frames associated with the content changes, the changes may be mapped to the master stream and made available to the licensee. The licensee may pay an incremental license fee for access to updated content.

12 Claims, 8 Drawing Sheets

UNIFIED CONTENT REPRESENTATION

BACKGROUND

Content like movies, songs, podcasts, or electronic books may be available in different formats and versions. For example, a movie may be available with aspect ratios of 16:9 or 4:3. Additionally, a movie may be available in a standard edition, a director's cut, or an extended edition. A movie may also be available in a G rated version, a PG rated version, and an R rated version. A movie may also be available for VHS (Video Home System), Beta (Betamax), DVD (Digital Versatile Disc), Blu-ray, or other apparatus. A movie may also be available in different regional versions where product placement is customized to different regions, countries, cultures, or languages.

Consumers may not like buying the same content over and over. Consider a consumer who has a favorite movie (e.g., Pride and Prejudice). Over the years the consumer may have purchased a VHS version, then a DVD version, then a Blu-ray version, and then a downloadable version. Additionally, as the movie was re-mastered the consumer may have purchased the re-mastered version(s). Furthermore, to insure that the consumer had all the content, the consumer may have purchased special releases that included new or altered content. While some consumers may engage in this type of purchasing behavior, other consumers may delay or forego making purchases if they consider it likely that the content may become "stale" or even "obsolete" in a certain time frame. For example, if a consumer knows that a new type of movie viewer is about to be released, the consumer may delay a purchase until after the new type of movie viewer is available.

Packaging many different but related streams together has not been a viable option for distributing all permutations of an instance of content. Additionally, packaging multiple existing streams together cannot possibly account for streams that have not yet been produced. Conventional licensing models for digital content distribution involves having consumers pay anew for the same master content after it has been modified in some way (e.g., re-mastered, higher resolution, additional scenes, formatted for new device). Conventional licensing models may dis-incentivize consumers to acquire what may be perceived as incremental improvements to content.

SUMMARY

This Summary is provided to introduce, in a simplified form, a selection of concepts that are further described below in the Detailed Description. This Summary is not intended to identify key features or essential features of the claimed subject matter, nor is it intended to be used to limit the scope of the claimed subject matter.

Example methods and apparatus are directed towards handling a request to access frames associated with a title for which a unified content representation is available. The request may be received from a holder of a license to a master stream of frames for the title. The master stream of frames may include frame-level mappings to multiple different specific streams of frames associated with the title. The master stream may be employed by example methods and apparatus to control, at least in part, how frames associated with the title are provided. In one embodiment, a first specific stream of frames may be selected from the different specific streams to provide frames in response to the request.

Example methods and apparatus may be configured to provide content having a unified content representation to a licensee. Example methods and apparatus may be configured to manage a relationship between a version of the content and a frame index that provides access to multiple different versions of the content. Example methods and apparatus may be configured to select a first version of the content from which frames are to be provided to the licensee based, at least in part, on a condition associated with the licensee, and to provide frames to the licensee from the first version as controlled, at least in part, by the frame index. In one embodiment, the stream from which frames are being provided may be changed seamlessly, mid-stream, to a different stream.

BRIEF DESCRIPTION OF THE DRAWINGS

The accompanying drawings illustrate various example apparatus, methods, and other embodiments described herein. It will be appreciated that the illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa. Furthermore, elements may not be drawn to scale.

DETAILED DESCRIPTION

Example apparatus and methods facilitate providing an apparatus-versatile, future-proof, incremental license to a unified representation of content associated with a title. Rather than licensing separate instances of content (e.g., a movie) on separate media, a consumer may license the right to access a master stream of frames associated with the content. The master stream of frames may represent a cohesive package in which various forms of the content are related so that frames from one variant may be related to frames from another variant. The master stream recognizes that a movie, a book, a podcast, or other content may be organized or stored as a stream of frames and that switches between streams of frames may be made midstream. The relationship between the various streams of frames may be, for example, a frame level mapping. The mapping allows consumers to easily select different streams or to transition seamlessly between streams.

Figure 1:
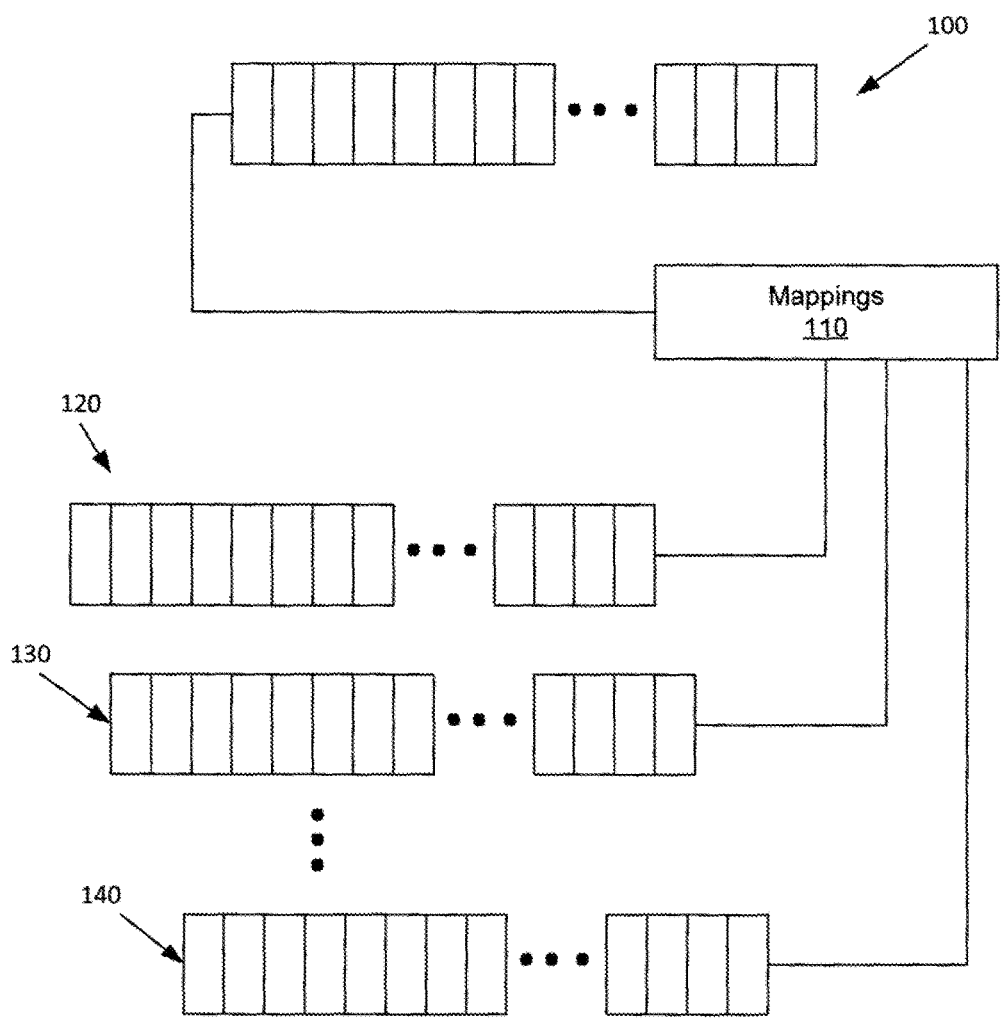
FIG. 1 illustrates an example master stream of frames providing a unified representation to content for which multiple versions are available in multiple specific streams of frames.

FIG. 1 illustrates a master stream of frames 100 associated with a title. The title may be, for example, a movie. The movie may be pre-rendered digital content where the pre-rendering produced a time-ordered series of related frames that may be presented in order to show the movie. There may be several versions of the movie available. For example, a first version of the movie may be stored as a stream 120 of frames, a second version of the movie may be stored as a stream 130 of frames, and an nth version of the movie may be stored as a stream 140 of frames. While three versions are shown, a greater or lesser number of versions may be available. The versions may be related to the master stream 100 of frames through a set of mappings 110. The mappings may identify, for example, which frame in a specific stream of frames corresponds to a frame in the master stream 100 of frames. The identification may be time based, sequence based, or based on other attributes.

The mappings 110 allow consumers to be presented with frames from different streams at different times under different conditions. For example, at a first time, a consumer may be watching a movie on a first lower quality device. At this first time, the consumer may be presented with frames from stream 120, which is optimized for that first lower quality device. In different embodiments, the user may have requested that frames be presented from the first stream 120 of frames or example apparatus or methods may have controlled that frames be presented from the first stream 120. At a second time, the consumer may be watching the movie on a second higher quality device. At this second time, the consumer may be presented with frames from a second stream 130, which is optimized for the second higher quality device. Once again, the user may request that frames be presented from the second stream 130 or example apparatus and methods may control from which stream the frames are presented. In one embodiment, the streams of frames may be stored on a server and delivered to the consumer through a network. In another embodiment, a stream or streams of frames may be stored on a device local to the consumer (e.g., smartphone).

Figure 2:
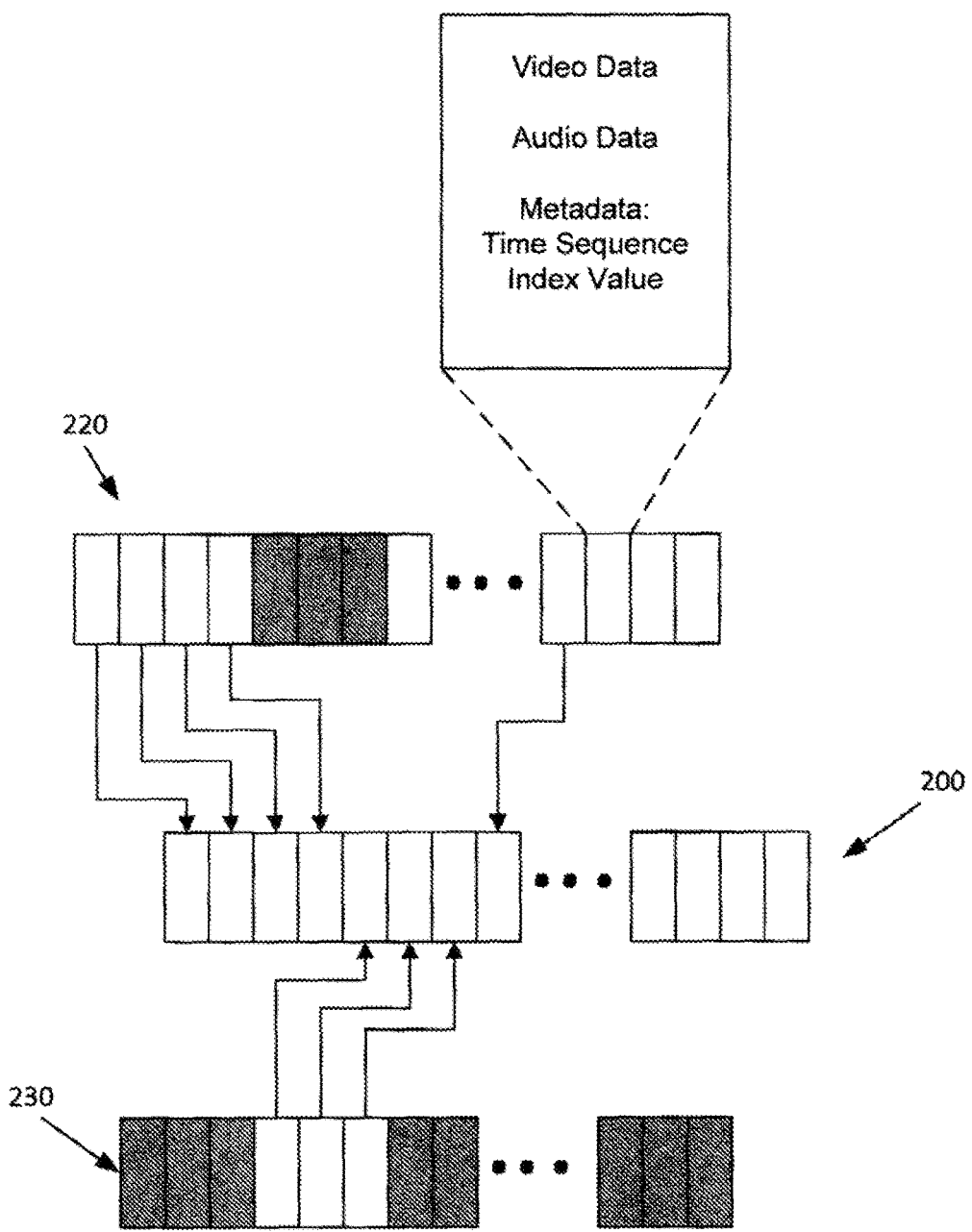
FIG. 2 illustrates an example of frames being presented from two different streams.

FIG. 2 illustrates how frames may be presented from one stream 220 and then from another stream 230 and then back again from stream 220. The frames are correlated to a master stream of frames 200. White frames are illustrated being provided to the master stream 200 while shaded frames are not provided to the master stream. In one embodiment, the switch from one stream of frames to another stream of frames may be made seamlessly as, for example, a user walks from room to room where different display devices are available. In another embodiment, the switch from one stream to another stream may be made seamlessly as, for example, a display device detects that a child enters or exits the viewing area. Making the switch seamlessly may involve switching frames without compromising the user experience and without missing relevant frames that ought to be displayed. In one embodiment, the selection and subsequent switching of streams may be controlled by an explicit user request.

The streams of frames that are available may be updated without necessarily requiring the consumer to acquire an additional license. For example, as a newly re-mastered version of the content becomes available, a mapping of the re-mastered version to the master version may be produced. The consumer may then be able to access the re-mastered version using their license to the master version. In another example, additional content for an existing stream of frames may become available. For example a "lost scene" may be discovered. The frames associated with the lost scene may be mapped to the master stream and thus made available to the consumer through their existing license. In one embodiment, as additional content becomes available, an incremental license charge may be requested from the consumer. In one embodiment, the incremental license charge may be less than the cost of acquiring an entirely new license.

Content, like movies, may be stored as a stream of frames. There may be multiple streams of frames available for a piece of content. However, when taken collectively, the multiple streams may be seen to have a super set of content from which different individual streams of frames can be presented. Since the movie or other content may be associated with the super set or master stream, a consumer may select different streams at different times or even switch between different streams at different times since the next frame to be viewed can be selected based on the previous frame viewed and the relationship between the frame-in-use in the master stream and the next-frame-up in the selected stream. From one point of view, the master stream may be considered to be an application that provides frames from current or even future streams of frames. Future streams may, for example, include additional content, may re-order frames, may rely on revised frame-to-frame mappings, or may rely on revised frame-to-audio mappings.

With the master stream available for license, a consumer may be incentivized to license the content knowing that future releases, updates, or even future devices will not require them to acquire a completely new license. Instead, the prospect of free updates or incremental costs may lead a consumer to make a purchase that they may otherwise delay or forego completely. The consumer may consider the license to the stream to be "future-proof" with respect to both content content format, and display devices.

In one embodiment, a system may combine varying digital content streams into a super stream or master stream. While frames from only a single stream of frames may be provided to a consumer at one time, the consumer may have access to multiple different streams of frames, may be able to select a stream from which frames are to be provided, and may be able to seamlessly switch between frames even while accessing (e.g., watching, listening to) the content. An individual stream of frames may be regenerated and provided using the master stream of frames. The master stream of frames may also be used to map one stream of frames to another stream of frames. In one embodiment the mapping of individual streams of frames to the master stream of frames facilitates switching, even frame-by-frame, from one stream to another. The switching may be user-controlled, device-controlled, or controlled in other ways. The switching may also be request driven, event driven, or driven by other factors.

Relating a stream of frames to the master stream may be performed using automated tools. For example, scenes in different content streams may be matched and time indexed using, for example, scene recognition or audio recognition software or devices. Scenes or frames may be tagged with metadata produced by the scene recognition or audio recognition software. Mappings from frames to the master stream may then be made as a function of the metadata. The metadata may describe, for example, the frame order as represented by a preceding frame and a subsequent frame. The preceding and subsequent relationship may be based, for example, on time indexes. The time indexes may be absolute (e.g., this frame displays three minutes and seven seconds into the presentation) or relative (e.g., this frame displays one second after a preceding frame and one second before a subsequent frame). Frame 222 is shown in greater detail. Frame 222 includes video data, audio data, and metadata (e.g., time sequence index value). A time sequence index value may describe, for example, a time that is used to place a frame in its proper order in a sequence of frames. In different embodiments the time may be absolute or relative.

Some portions of the detailed descriptions that follow are presented in terms of algorithms and symbolic representations of operations on data bits within a memory. These algorithmic descriptions and representations are used by those skilled in the art to convey the substance of their work to others. An algorithm is considered to be a sequence of operations that produce a result. The operations may include creating and manipulating physical quantities that may take the form of electronic values. Creating or manipulating a physical quantity in the form of an electronic value produces a concrete, tangible, useful, real-world result.

It has proven convenient at times, principally for reasons of common usage, to refer to these signals as bits, values, elements, symbols, characters, terms, numbers, and other terms. It should be borne in mind, however, that these and similar terms are to be associated with the appropriate physical quantities and are merely convenient labels applied to these quantities. Unless specifically stated otherwise, it is appreciated that throughout the description, terms including processing, computing, and determining, refer to actions and processes of a computer system, logic, processor, or similar electronic device that manipulates and transforms data represented as physical quantities (e.g., electronic values).

Example methods may be better appreciated with reference to flow diagrams. For simplicity, the illustrated methodologies are shown and described as a series of blocks. However, the methodologies may not be limited by the order of the blocks because, in some embodiments, the blocks may occur in different orders than shown and described. Moreover, fewer than all the illustrated blocks may be required to implement an example methodology. Blocks may be combined or separated into multiple components. Furthermore, additional or alternative methodologies can employ additional, not illustrated blocks.

Figure 3:
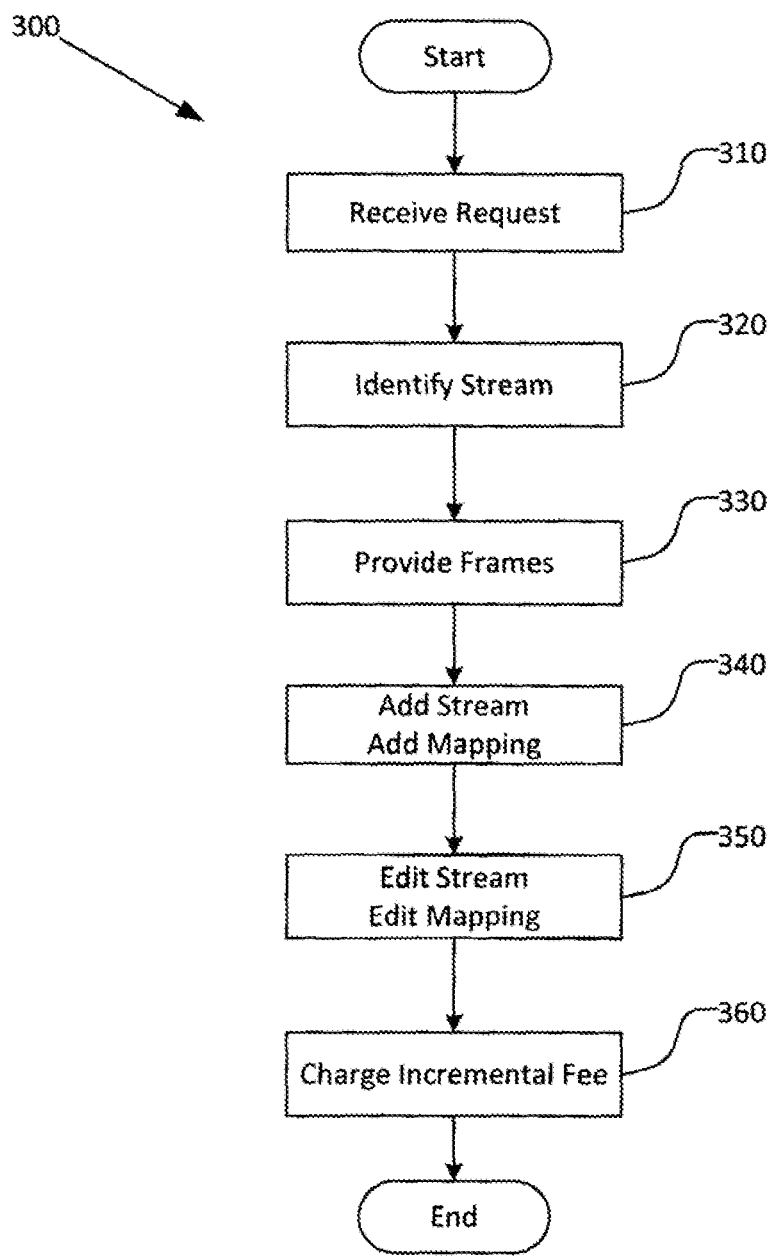
FIG. 3 illustrates an example method associated with providing content for which a unified content representation is available.

FIG. 3 illustrates an example method 300. Method 300 includes, at 310, receiving a request to access frames associated with a title for which a unified content representation is available. The title may be, for example, pre-rendered digital content (e.g., movie, song, album, podcast, electronic book). The unified content representation may account for the existence of multiple different versions of the content that are available as different specific streams of frames. Different specific streams may differ in various properties including, but not limited to, aspect ratio, size, language, compression, rating, version, or length. For example, a movie may have a first version that is available with a 4:3 aspect ratio and may also have a second version that is available in a 16:9 aspect ratio. Similarly, a song may have a pop mix and a club mix. An electronic book (eBook) may have an unabridged version and an abridged version.

The request may be received from a holder of a license to a master stream of frames for the title. The holder of the license may be, for example, a person, a process, or a device. The license may be personal to a human, which allows the human to access the content through different devices at different locations and times under different conditions. The license may be specific to a device (e.g., display screen in a kiosk). The license may be specific to a certain process (e.g., web based advertising process). The license may be considered to be a future-proof license that selectively grants access to current specific streams, future specific streams, and updates to specific streams. Different licenses may be available.

In one embodiment, the master stream includes frame-level mappings to different specific streams of frames associated with the title. The master stream may therefore be configured to control, at least in part, how frames associated with the title are provided. For example, the master stream may control how frames from different versions of movies with different aspect ratios are presented, may control how frames from different mixes of a song are presented, may control how frames from an (un)abridged eBook are presented, and may control how other frames associated with other titles or content are presented.

In one embodiment, a frame includes video data, audio data, and metadata. The metadata may include a time sequence index value that is configured to support a mapping between the frame and the master stream. In another embodiment, a frame may only include audio data and metadata. Once again the metadata may include a time sequence index value that facilitates correlating a stream of frames associated with a specific version of the content to the master stream of frames. In one embodiment, method 300 may include establishing a mapping between a specific stream of frames and the master stream. The mapping may be based, at least in part, on time sequence index values associated with the specific stream and the master stream. In one embodiment, automated scene recognition or automated audio recognition may be performed to establish the time sequence index value for a frame.

Method 300 also includes, at 320, identifying a first specific stream of frames from the different specific streams from which frames will be provided in response to the request. The first specific stream may be identified based on various parameters and conditions associated with the request. By way of illustration, the first specific stream may be identified as a function of the holder of the license. For example, the holder of the license ("the licensee") may have established preferences for streams. Additionally or alternatively, the first specific stream may be identified as a function of the license. For example, the license may only grant access to certain versions of the content. Additionally or alternatively, the first specific stream may be identified as a function of explicit data in the request. For example, the licensee or requester may have identified the version of the content that they wish to have presented. Additionally or alternatively, the first specific stream may be identified as a function of implicit data associated with the request. The implicit data may include, for example, a device to which frames are to be provided or bandwidth available to provide frames. Additionally or alternatively, the first specific stream may be identified as a function of a current audience to which frames are to be provided. In one embodiment, the audience may be identified in the request or may be identified by an apparatus that will present the frames. For example, a G rated version may be presented if the audience includes children while an R rated version may be presented if the audience only includes adults.

Method 300 also includes, at 330, selectively providing frames from the first specific stream as controlled by the master stream, by a mapping between the first specific stream and the master stream, and by the license. Providing the frames may include, for example, displaying video data, making audio data audible, displaying text from an eBook, or other actions that cause a machine to produce a detectable output that is controlled by the frame.

Content may not remain static. That is one of the reasons to offer a future-proof incremental license. Thus, in one embodiment, method 300 may include, at 340, selectively adding a new specific stream of frames to the different specific streams and establishing a new mapping from the new specific stream to the master stream. Similarly, method 300 may include, at 350, selectively editing a member of the different specific streams and editing a mapping from the member to the master stream. Once the addition or edit has been made, method 300 may also include, at 360, selectively charging the holder of the license an incremental license fee associated with the addition or edit.

Figure 4:
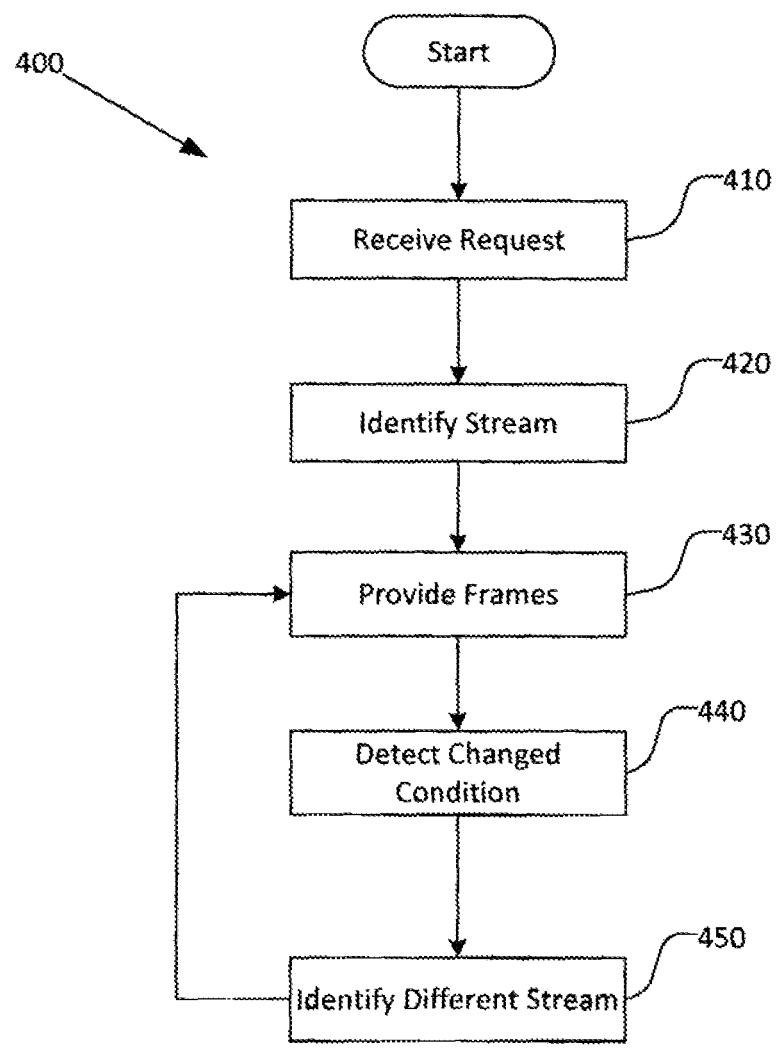
FIG. 4 illustrates an example method associated with providing content for which a unified content representation is available.

FIG. 4 illustrates an example method 400. Method 400 includes several actions similar to those described in connection with method 300. For example, method 400 includes receiving a request at 410, identifying a stream at 420, and providing frames at 430. However, method 400 includes additional, different actions.

For example, method 400 includes, at 440, detecting a changed condition. The changed condition may be detected from, for example a user choice or an event. The user choice may be provided through an interaction with a user interface. For example, a user may make a menu selection, make a gesture, issue a voice command, click on an icon, or take another action that indicates that they want something different than what they have now. For example, a user may indicate that they would like to change from a club mix to a pop mix of a song or may indicate that they would like to change from a standard cut of a movie to a director's cut of the movie. An event may be, for example, something other than a user interface action that is detected by an apparatus or process associated with providing frames to the user. For example, an event may be identified when a user switches from one presentation device (e.g., television, computer) to a different presentation device. An event may also be identified when a condition like the bandwidth available to present frames changes.

Once the changed condition has been identified at 440, method 400 may include, at 450, identifying a second, different specific stream of frames from which frames are to be provided. Once the second, different specific stream of frames has been identified, method 400 may return to 430 to continue providing frames. In one embodiment, selecting the second, different specific stream of frames and returning to 430 may be performed seamlessly so that a user may not perceive the switch and so that no content that ought to be provided is missed. In one embodiment, a user may wish to be notified that the stream of frames has switched. Thus, in one embodiment, a notification may be provided to the user. In one embodiment, the user may be able to override the suggested switch.

While FIGS. 3 and 4 illustrate various actions occurring in serial, it is to be appreciated that various actions illustrated in FIGS. 3 and 4 could occur substantially in parallel. By way of illustration, a first process could manage a future-proof license, a second process could establish and manage mappings from specific versions of content to a master stream or frame index, and a third process could control selecting streams from which frames are to be provided and then providing frames. While three processes are described, it is to be appreciated that a greater or lesser number of processes could be employed and that lightweight processes, regular processes, threads, and other approaches could be employed.

In one example, a method may be implemented as computer executable instructions. Thus, in one example, a computer-readable storage medium may store computer executable instructions that if executed by a machine (e.g., computer) cause the machine to perform methods described or claimed herein including methods 300 or 400. While executable instructions associated with the listed methods are described as being stored on a computer-readable storage medium, it is to be appreciated that executable instructions associated with other example methods described or claimed herein may also be stored on a computer-readable storage medium. In different embodiments, the example methods described herein may be triggered in different ways. In one embodiment, a method may be triggered manually by a user. In another example, a method may be triggered automatically.

Figure 5:
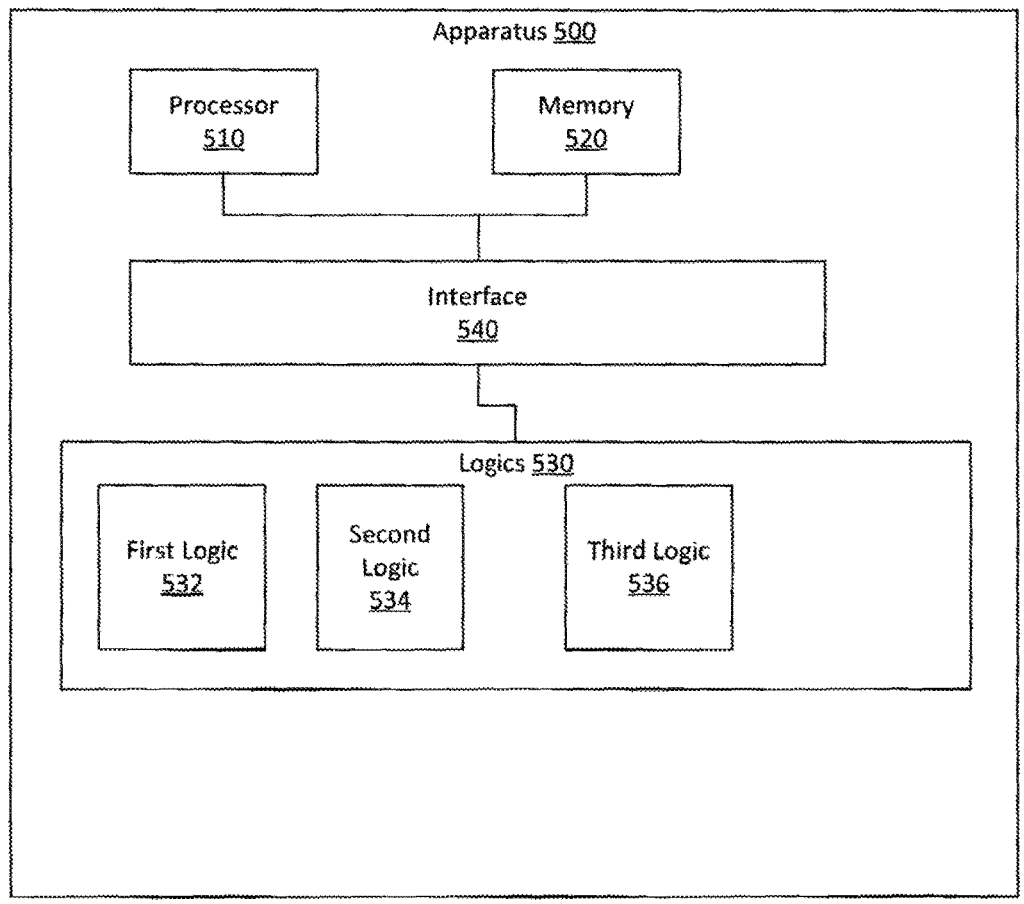
FIG. 5 illustrates an example apparatus associated with providing content for which a unified content representation is available.

FIG. 5 illustrates an example apparatus 500. In one example, the apparatus 500 includes an interface 540 configured to connect a processor 510, a memory 520, and a set 530 of logics. Elements of the apparatus 500 may be configured to communicate with each other, but not all connections have been shown for clarity of illustration. In one embodiment, the apparatus 500 may be a general purpose computer that has been transformed into a special purpose computer through the inclusion of the set of logics 530. Apparatus 500 may interact with other apparatus, processes, and services through, for example, a computer network.

The set 530 of logics may be configured to provide to a licensee content that has a unified content representation. The unified content representation may be available through, for example, a frame index. In one embodiment, the content may pre-rendered digital content (e.g., movie, song, eBook) that has been partitioned into streams of frames that have been correlated to other streams of frames using the frame index. The content provided by apparatus 500 is controlled, at least in part, by a perpetual incremental license held by the licensee. The licensee may be, for example, a person, a process, or a machine.

The set 530 of logics may include a first logic 532 that is configured to manage a relationship between a version of the content and the frame index. The frame index may be configured to provide access to multiple different versions of the content. The versions may differ in, for example, aspect ratio, size, language, compression, rating, version, or length. In one embodiment, managing the relationship between the version of the content and the frame index includes correlating a frame in the version to a frame in the frame index based on a time sequence index. Time sequence indexes may be generated by, for example, an automated recognition process or apparatus. The recognition may be scene recognition, audio recognition, or other recognitions from which frames can be correlated. The correlation may be a function of time sequence indexes assigned to frames in a version and frames in the frame index. In one embodiment, time sequence indexes can be used to correlate one version to another version without using the frame index.

The set 530 of logics may also include a second logic 534 that is configured to select a first version of the content from which frames are to be provided to the licensee. The selection may be based, at least in part, on a condition associated with the licensee. The condition associated with the licensee may concern, for example, a device to be used to present the content. For example, while the licensee is in a first location the licensee may be presented with the frames through a first device (e.g., regular definition television) having a first set of capabilities. The version of the content may be selected based on the first set of capabilities. But at a second different time when the licensee is in a second different location the licensee may be presented with the frames through a second device having a second set of capabilities (e.g., high definition television). The version of the content may then be selected based on the second set of capabilities. In one embodiment, the condition associated with the licensee may be a bandwidth available for presenting the content. For example, at a first time there may be a first lower amount of bandwidth available to provide frames to the licensee while at a second time there may be a second greater amount of bandwidth available. The second logic 534 may select the version from which frames are to be provided based, at least in part, on the bandwidth available. Other conditions associated with the licensee may be considered. For example, the licensee may explicitly request a certain version.

The set 530 of logics may also include a third logic 536 that is configured to provide frames to the licensee from the first version as controlled, at least in part, by the frame index. Providing the frames may include, for example, displaying frames on a display, causing a speaker to produce sounds, sending frames or collections of frames to a device, or other actions.

Conditions may change while a licensee is being provided frames. Thus, in one embodiment, the second logic 534 may be configured to select a second different version of the content in response to a changed condition associated with the licensee. Once the second logic 534 has selected a second different version of the content, the third logic 536 may seamlessly switch to providing frames to the licensee from the second version as controlled, at least in part, by the frame index. Seamlessly switching may include, for example, switching from one stream of frames to another stream of frames without disrupting a user experience with the content. Seamlessly switching may also include, for example, switching from one stream of frames to another stream of frames without skipping frames that ought to be provided.

Processor 510 may be, for example, a signal processor, a microprocessor, an application specific integrated circuit (ASIC), or other control and processing logic circuitry for performing tasks including signal coding, data processing, input/output processing, power control, or other functions. Processor 510 may be configured to interact with logics 530 that provide frame and stream based access to a unified content representation through a super set of frames.

Memory 520 can include non-removable memory or removable memory. Non-removable memory may include random access memory (RAM), read only memory (ROM), flash memory, a hard disk, or other memory storage technologies. Removable memory may include flash memory, or other memory storage technologies, such as "smart cards." Memory 520 may be configured to store the master stream, the license, Information for accessing the master stream, information for accessing the license, or other information.

Figure 6:
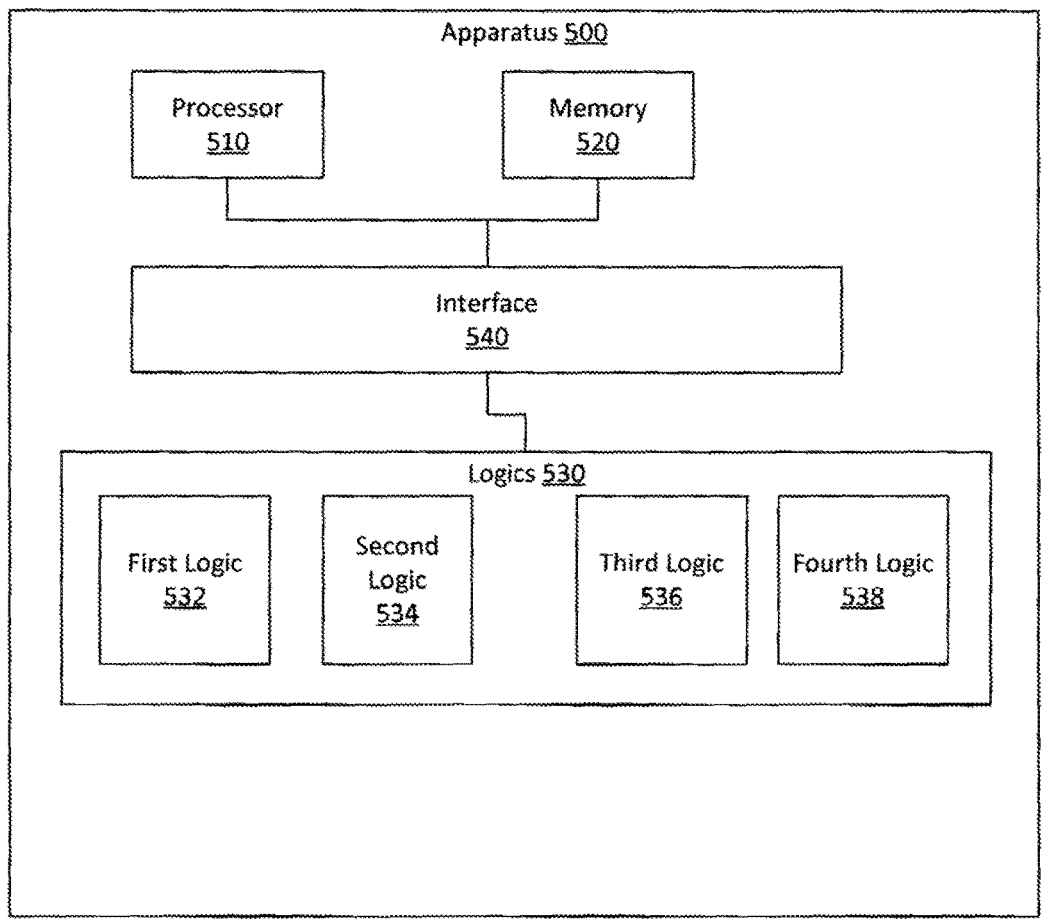
FIG. 6 illustrates an example apparatus associated with providing content for which a unified content representation is available.

FIG. 6 illustrates another embodiment of apparatus 500. This embodiment of apparatus 500 includes a fourth logic 538. Fourth logic 538 may be configured to selectively charge an incremental fee to the holder of the perpetual incremental license upon detecting that the licensee has accessed updated content. For example, if a new stream of frames is mapped to the master stream and thus made available to the licensee, the licensee may be charged an incremental fee. Similarly, if an existing stream of frames is edited (e.g., re-mastered, new scenes added), then the licensee may be charged an incremental fee.

Figure 7:
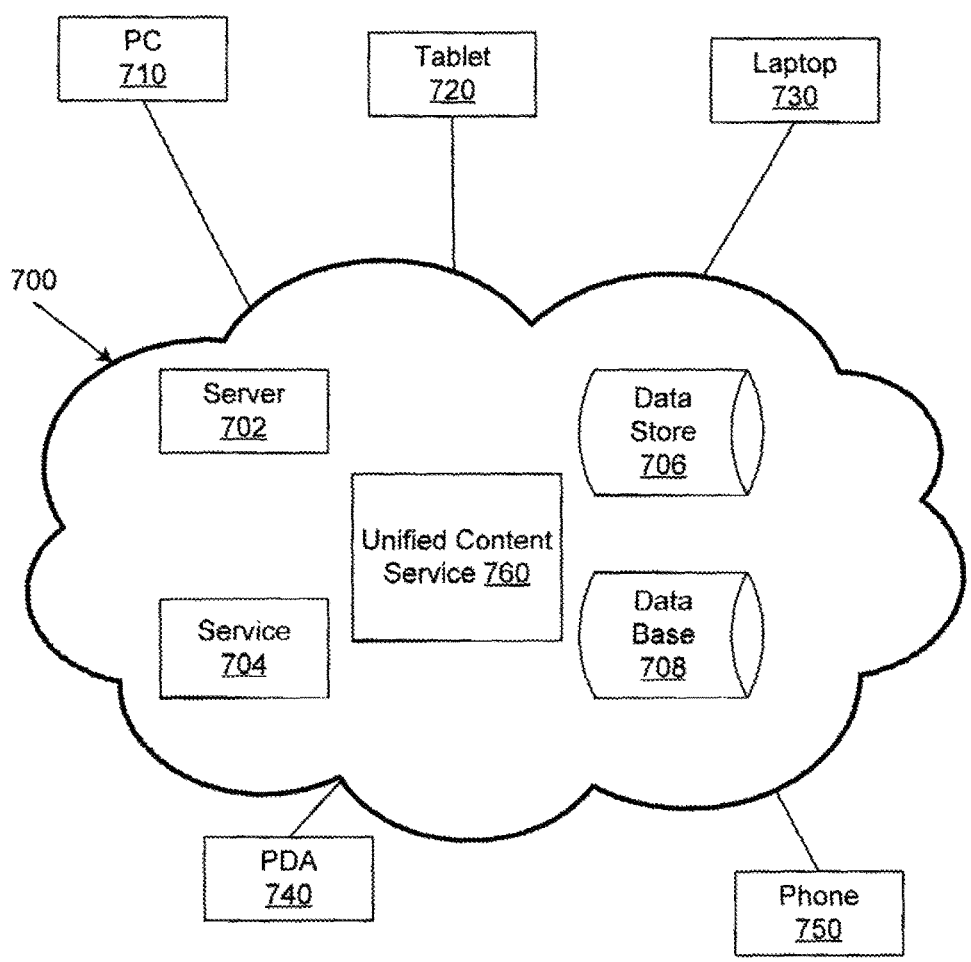
FIG. 7 illustrates an example cloud operating environment in which a unified content service may operate.

FIG. 7 illustrates an example cloud operating environment 700. A cloud operating environment 700 supports delivering computing, processing, storage, data management, applications, and other functionality as an abstract service rather than as a standalone product. Services may be provided by virtual servers that may be implemented as one or more processes on one or more computing devices. In some embodiments, processes may migrate between servers without disrupting the cloud service. In the cloud, shared resources (e.g., computing, storage) may be provided to computers including servers, clients, and mobile devices over a network. Different networks (e.g., Ethernet, Wi-Fi, 802.x, cellular) may be used to access cloud services. Users interacting with the cloud may not need to know the particulars (e.g., location, name, server, database) of a device that is actually providing the service (e.g., computing, storage). Users may access cloud services via, for example, a web browser, a thin client, a mobile application, or in other ways.

FIG. 7 illustrates an example unified content service 760 residing in the cloud. The unified content service 760 may rely on a server 702 or service 704 to perform processing and may rely on a data store 706 or database 708 to store data. While a single server 702, a single service 704, a single data store 706, and a single database 708 are illustrated, multiple instances of servers, services, data stores, and databases may reside in the cloud and may, therefore, be used by the unified content service 760.

FIG. 7 illustrates various devices accessing the unified content service 760 in the cloud. The devices include a computer 710, a tablet 720, a laptop computer 730, a personal digital assistant 740, and a mobile device (e.g., cellular phone, satellite phone) 750. It is possible that different users at different locations using different devices may access the unified content service 760 through different networks or interfaces. In one example, the unified content service 760 may be accessed by a mobile device 750. In another example, portions of unified content service 760 may reside on a mobile device 750. Unified content service 760 may perform actions including, for example, providing access to a unified representation of a title through a master stream of frames or a frame index, controlling access to different versions of the title available through the unified representation, charging incremental license fees for updates to the title, or other actions. In one embodiment, unified content service 760 may perform portions of methods described herein (e.g., method 300, method 400).

Figure 8:
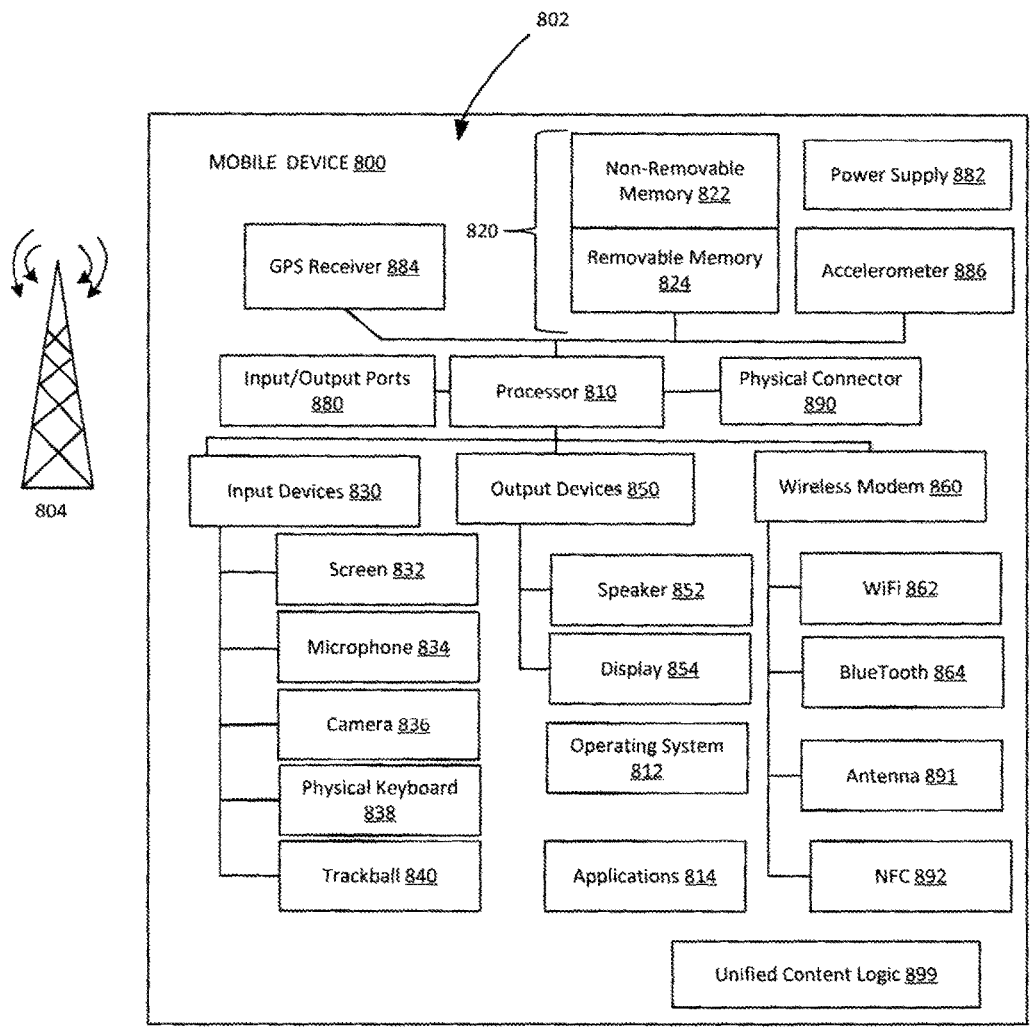
FIG. 8 is a system diagram depicting an exemplary mobile communication device configured with logic for providing content for which a unified content representation is available.

FIG. 8 is a system diagram depicting an exemplary mobile device 800 that includes a variety of optional hardware and software components, shown generally at 802. Components 802 in the mobile device 800 can communicate with other components, although not all connections are shown for ease of illustration. The mobile device 800 may be a variety of computing devices (e.g., cell phone, smartphone, handheld computer, Personal Digital Assistant (PDA), etc.) and may allow wireless two-way communications with one or more mobile communications networks 804, such as a cellular or satellite networks.

Mobile device 800 can include a controller or processor 810 (e.g., signal processor, microprocessor, application specific integrated circuit (ASIC), or other control and processing logic circuitry) for performing tasks including establishing a future-proof incremental license for a unified representation of content, managing the future-proof incremental license, selectively providing access to the unified representation, or other functions. An operating system 812 can control the allocation and usage of the components 802 and support application programs 814. The application programs 814 can include mobile computing applications (e.g., email applications, calendars, contact managers, web browsers, messaging applications), or other computing applications.

Mobile device 800 can include memory 820. Memory 820 can include non-removable memory 822 or removable memory 824. The non-removable memory 822 can include random access memory (RAM), read only memory (ROM), flash memory, a hard disk, or other memory storage technologies. The removable memory 824 can include flash memory or a Subscriber Identity Module (SIM) card, which is known in GSM communication systems, or other memory storage technologies, such as "smart cards." The memory 820 can be used for storing data or code for running the operating system 812 and the applications 814. Example data can include license data, licensee data, content data, content request data, context data, web pages, text, images, sound files, video data, or other data sets to be sent to or received from one or more network servers or other devices via one or more wired or wireless networks. The memory 820 can store a subscriber identifier, such as an International Mobile Subscriber Identity (IMSI), and an equipment identifier, such as an International Mobile Equipment Identifier (IMEI). The identifiers can be transmitted to a network server to identify users or equipment.

The mobile device 800 can support one or more input devices 830 including, but not limited to, a screen 832 that is touch or hover sensitive, a microphone 834, a camera 836, a physical keyboard 838, or trackball 840. The mobile device 800 may also support output devices 850 including, but not limited to, a speaker 852 and a display 854. Other possible input devices (not shown) include accelerometers (e.g., one dimensional, two dimensional, three dimensional). Other possible output devices (not shown) can include piezoelectric or other haptic output devices. Some devices can serve more than one input/output function. The input devices 830 can include a Natural User Interface (NUI). An NUI is an interface technology that enables a user to interact with a device in a "natural" manner, free from artificial constraints imposed by input devices such as mice, keyboards, remote controls, and others. Examples of NUI methods include those relying on speech recognition, touch and stylus recognition, gesture recognition (both on screen and adjacent to the screen), air gestures, head and eye tracking, voice and speech, vision, touch, gestures, and machine intelligence. Other examples of a NUI include motion gesture detection using accelerometers/gyroscopes, facial recognition, three dimensional (3D) displays, head, eye, and gaze tracking, immersive augmented reality and virtual reality systems, all of which provide a more natural interface, as well as technologies for sensing brain activity using electric field sensing electrodes (electro-encephalogram (EEG) and related methods). Thus, in one specific example, the operating system 812 or applications 814 can comprise speech-recognition software as part of a voice user interface that allows a user to operate the device 800 via voice commands. Further, the device 800 can include input devices and software that allow for user interaction via a user's spatial gestures, such as detecting and interpreting gestures to provide input to an application.

A wireless modem 860 can be coupled to an antenna 891. In some examples, radio frequency (RF) filters are used and the processor 810 need not select an antenna configuration for a selected frequency band. The wireless modem 860 can support two-way communications between the processor 810 and external devices. The modem 860 is shown generically and can include a cellular modem for communicating with the mobile communication network 804 and/or other radio-based modems (e.g., Bluetooth 864 or Wi-Fi 862). The wireless modem 860 may be configured for communication with one or more cellular networks, such as a Global system for mobile communications (GSM) network for data and voice communications within a single cellular network, between cellular networks, or between the mobile device and a public switched telephone network (PSTN). Mobile device 800 may also communicate locally using, for example, near field communication (NFC) element 892.

The mobile device 800 may include at least one input/output port 880, a power supply 882, a satellite navigation system receiver 884, such as a Global Positioning System (GPS) receiver, an accelerometer 886, or a physical connector 890, which can be a Universal Serial Bus (USB) port, IEEE 1394 (FireWire) port, RS-232 port, or other port. The Illustrated components 802 are not required or all-inclusive, as other components can be deleted or added.

Mobile device 800 may include a unified content logic 899 that is configured to provide a functionality for the mobile device 800. For example, unified content logic 899 may provide a client for interacting with a service (e.g. service 760, FIG. 7). Portions of the example methods described herein may be performed by unified content logic 899. Similarly, unified content logic 899 may implement portions of apparatus described herein.

The following includes definitions of selected terms employed herein. The definitions include various examples or forms of components that fall within the scope of a term and that may be used for implementation. The examples are not intended to be limiting. Both singular and plural forms of terms may be within the definitions.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a medium that stores instructions or data. "Computer-readable storage medium" does not refer to propagated signals. A computer-readable storage medium may take forms, including, but not limited to, non-volatile media, and volatile media. Non-volatile media may include, for example, magnetic disks, tapes, and other media. Volatile media may include, for example, semiconductor memories, dynamic memory, and other media. Common forms of a computer-readable storage medium may include, but are not limited to, a floppy disk, a flexible disk, a hard disk, a magnetic tape, other magnetic medium, an application specific integrated circuit (ASIC), a compact disk (CD), a random access memory (RAM), a read only memory (ROM), a memory chip or card, a memory stick, and other media from which a computer, a processor or other electronic device can read.

"Data store", as used herein, refers to a physical or logical entity that can store data. A data store may be, for example, a database, a table, a file, a list, a queue, a heap, a memory, a register, and other physical repository. In different examples, a data store may reside in one logical or physical entity or may be distributed between two or more logical or physical entities.

"Logic", as used herein, includes but is not limited to hardware, firmware, software in execution on a machine, or combinations of each to perform a function(s) or an action(s), or to cause a function or action from another logic, method, or system. Logic may include a software controlled microprocessor, a discrete logic (e.g., ASIC), an analog circuit, a digital circuit, a programmed logic device, a memory device containing instructions, and other physical devices. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the Applicant intends to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for generating frames of content, comprising:
    receiving, at a computing device, multiple versions of content for a single title of content, in which the multiple versions differ according to one or more of aspect ratio, resolution, language, compression, rating, or length;
    mapping, at the computing device, the multiple versions of content into a single master stream which represents a unified content representation, in which the master stream includes frame-level mappings to different specific streams of frames associated with the single title of content using the multiple versions of content for the single title of content;
    receiving, at the computing device and from a first remote device, a request to access at least a portion of content associated with the single title of content, wherein the request comprises an identifier of the first remote device;
    controlling, at the computing device and using the single master stream, how frames associated with the single title of content are transmitted in response to the received request, in which controlling includes:
    identifying, at the computing device, a first specific stream of frames from the different specific streams;
    selectively transmitting, at the computing device, frames of the first version of the single title of content from the first specific stream to the first remote device using the master stream by using a license and the mapping between the first specific stream and the master stream;
    receiving, at the computing device and from a second remote device, a request to access at least a portion of content associated with the single title of content, wherein the request comprises an identifier of the second remote device;
    selecting, at the computing device, a second stream of frames from the different specific streams of frames using the license, the identifier of the second remote device, and the mapping; and,
    transmittinq, by the computing device, the selected second stream of frames to the second remote device while selectively transmitting frames of the first version of the single title of content from the first specific stream using the master stream to the first remote device.

2. The method of claim 1, wherein: the first remote device is associated with a holder of the license to the master stream of frames for the single title of content, and the holder of the license is a person, a process, or a device.

3. The method of claim 1, where the title is pre-rendered digital content.

4. The method of claim 3, where the pre-rendered digital content is a movie, a song, an album, a podcast, or an electronic book.

5. The method of claim 1, where the license is a future-proof license that grants access to a member of the different specific streams, to a future member of the different specific streams, and to an update to a member of the different specific streams.

6. The method of claim 5, where members of the different specific streams differ in aspect ratio, size, language, compression, rating, version, or length.

7. The method of claim 1, where a frame comprises video data, audio data, and metadata, where the metadata includes a time sequence index value configured to support the mapping between the frame and the master stream.

8. The method of claim 7, further comprising establishing the mapping between the specific stream of frames and the master stream based, at least in part, on time sequence index values associated with the specific stream and the master stream.

9. The method of claim 8, where establishing the mapping between the specific stream and the master stream comprises performing automated scene recognition or automated audio recognition to establish the time sequence index value for the frame.

10. The method of claim 1, further comprising: selectively adding a new specific stream of frames to the different specific streams and establishing a new mapping from the new specific stream to the master stream; and
    selectively editing a member of the different specific streams and editing a mapping from the member to the master stream.

11. The method of claim 10, further comprising: selectively charging the holder of the license an incremental license fee upon adding the new specific stream or editing the member.

12. The method of claim 1, where the first specific stream is identified as a function of the holder of the license, the license, explicit data in the request, implicit data associated with the request, a device to which frames are to be provided, bandwidth available to provide frames, or a current audience to which frames are to be provided.

* * * * *